United States Patent
Cerutti et al.

(10) Patent No.: US 7,220,094 B2
(45) Date of Patent: May 22, 2007

(54) TRANSFER DEVICE FOR CYLINDRICAL STACKS OF PRODUCTS ARRANGED ON AN EDGE

(75) Inventors: Giuliano Cerutti, Borgomanero (IT); Pierre Menegaldo, Borgosesia (IT); Filippo Barberis-Organista, Trivero (IT)

(73) Assignee: La Centrale & Partners S.p.A. (IT)

( * ) Notice: Subject to any disclaimer, the term of this patent is extended or adjusted under 35 U.S.C. 154(b) by 192 days.

(21) Appl. No.: 10/491,296

(22) PCT Filed: Sep. 19, 2002

(86) PCT No.: PCT/IB02/03909

§ 371 (c)(1), (2), (4) Date: Sep. 20, 2004

(87) PCT Pub. No.: WO03/031267

PCT Pub. Date: Apr. 17, 2003

(65) Prior Publication Data

US 2005/0066628 A1  Mar. 31, 2005

(30) Foreign Application Priority Data

Oct. 4, 2001 (EP) ............................... 01830627

(51) Int. Cl.
*B65B 23/12* (2006.01)
(52) U.S. Cl. .................. 414/798.5; 414/798.7; 198/430; 198/474.1
(58) Field of Classification Search ........... 414/798.2, 414/798.5, 798.7; 198/432, 433, 440, 418.6, 198/430, 474.1, 484.1, 598
See application file for complete search history.

(56) References Cited

U.S. PATENT DOCUMENTS 3,832,826 A * 9/1974 Ullman ................. 53/473

(Continued)

FOREIGN PATENT DOCUMENTS

CH 532 504 1/1973

(Continued)

OTHER PUBLICATIONS

International Search Report of Dec. 30, 2002.

*Primary Examiner*—Douglas Hess
(74) *Attorney, Agent, or Firm*—Greenberg Traurig, LLP; Charles Berman, Esq.; R. Joseph Foster, Esq.

(57) ABSTRACT

A transfer device for transferring stacks (4, 4a, 4b, 5, 5a, 5b), which have a cylindrical external shape, of products resting on one of their edges between a conveyor (1) set upstream for advance of the stacks (4, 4a, 4b, 5, 5a, 5b) in a direction (a) transverse to the generatrices of the aforesaid cylindrical shape, and a conveyor (2) set downstream for advance of the stacks In a direction parallel to said generatrices, or vice versa, the said transfer device being operatively set between said conveyor (1) set upstream and said conveyor (2) set downstream. The transfer device comprises at least one gripping assembly (3) for picking up and conveying a stack. Said gripping assembly (3) moreover turns, according to a motion of revolution. (C) about a first axis (X), between a position in which it engages a stack (4, 4a, 4b, 5, 5a, 5b), in a position (A) corresponding to an output end of the conveyor (1) set upstream, and a position (B) in which it releases the stack onto the conveyor (2) set downstream.

27 Claims, 10 Drawing Sheets

U.S. PATENT DOCUMENTS

| | | | |
|---|---|---|---|
| 3,927,508 A | 12/1975 | Campbell, III | 53/251 |
| 3,929,234 A * | 12/1975 | Warren | 414/737 |
| 4,394,899 A * | 7/1983 | Fluck | 198/408 |
| 4,627,215 A | 12/1986 | Walz | 53/246 |
| 4,669,600 A * | 6/1987 | Fluck | 198/408 |
| 4,921,088 A * | 5/1990 | Ter Horst | 198/418.7 |
| 5,381,884 A | 1/1995 | Spatafora et al. | 198/433 |
| 5,921,375 A * | 7/1999 | van Laar | 198/471.1 |
| 5,979,634 A * | 11/1999 | Odegard et al. | 198/408 |
| 6,182,814 B1 * | 2/2001 | Koehler | 198/418.7 |
| 6,283,694 B1 * | 9/2001 | Spatafora et al. | 414/416.05 |
| 6,364,091 B1 * | 4/2002 | Biondi et al. | 198/418 |
| 6,925,784 B2 * | 8/2005 | Escobar et al. | 53/540 |
| 6,971,839 B2 * | 12/2005 | Cerutti et al. | 414/798.7 |
| 7,033,129 B2 * | 4/2006 | Bigoni | 414/790.8 |

FOREIGN PATENT DOCUMENTS

| | | |
|---|---|---|
| EP | 0 084 763 | 8/1983 |
| GB | 1034382 | 6/1966 |
| GB | 2 072 121 | 9/1980 |

* cited by examiner

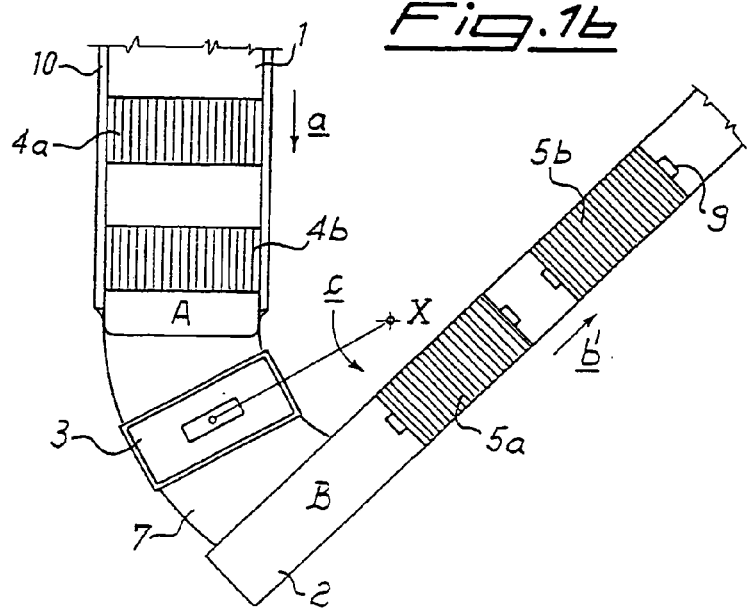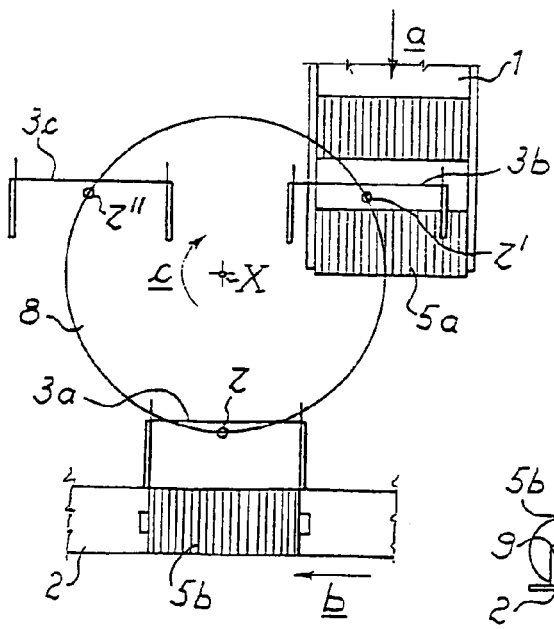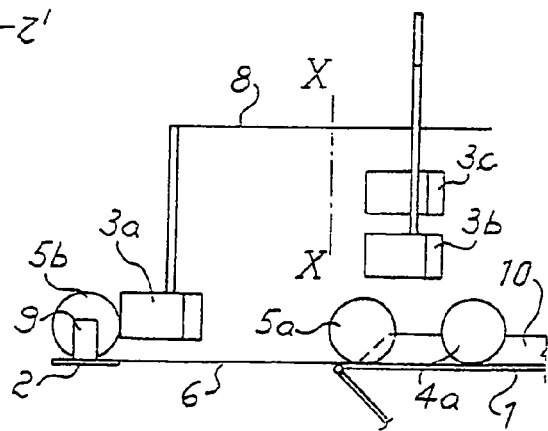

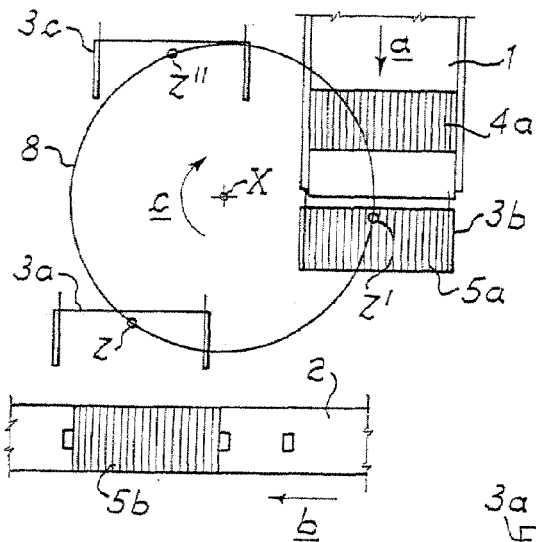
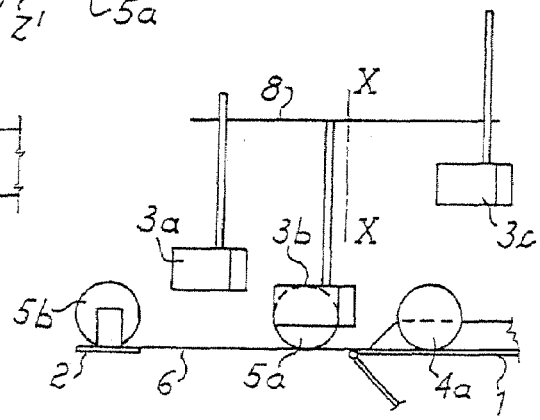
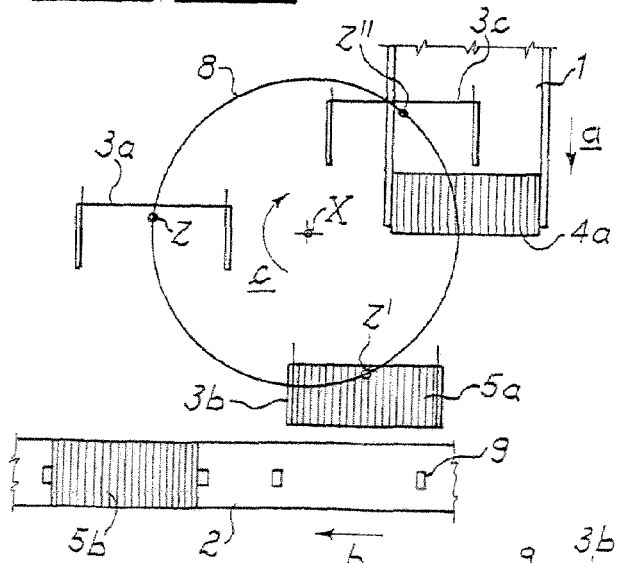

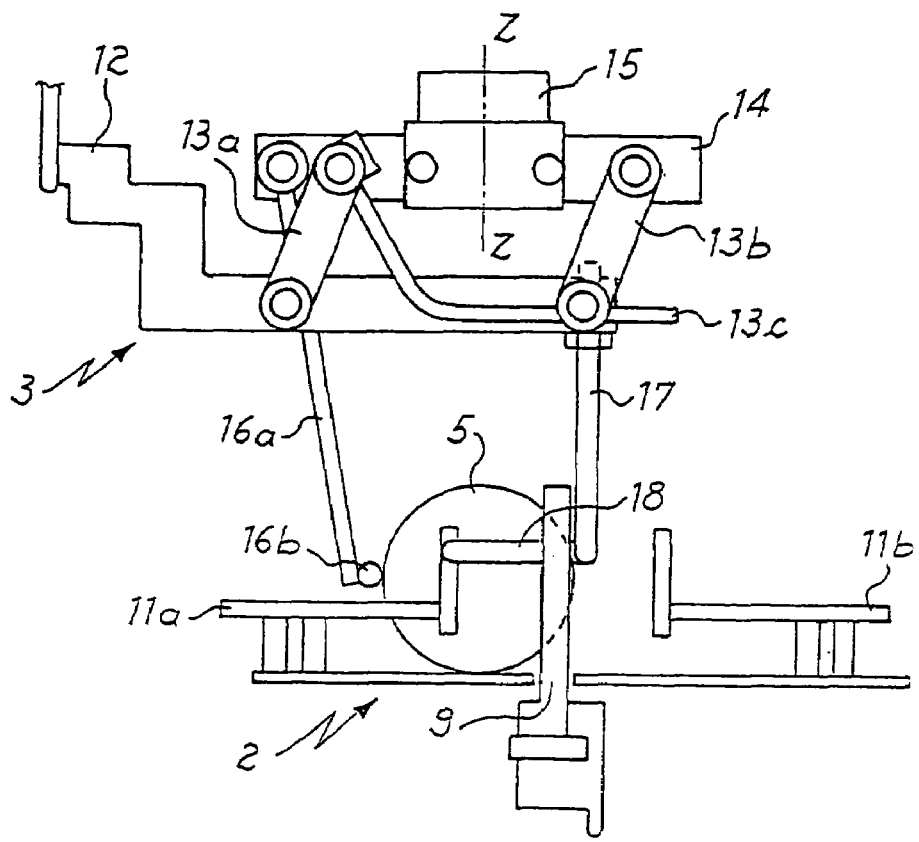
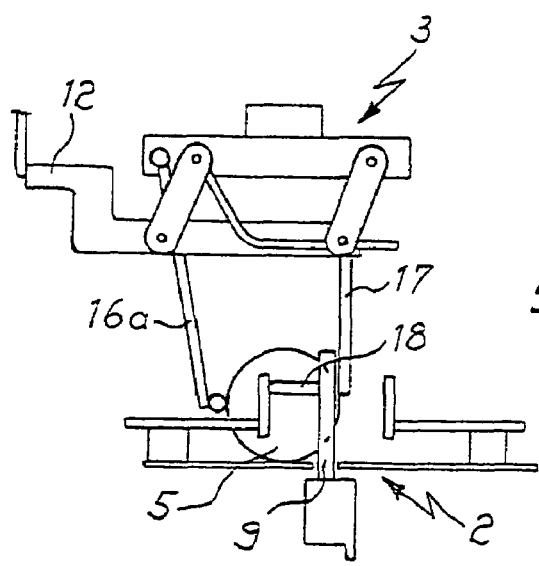

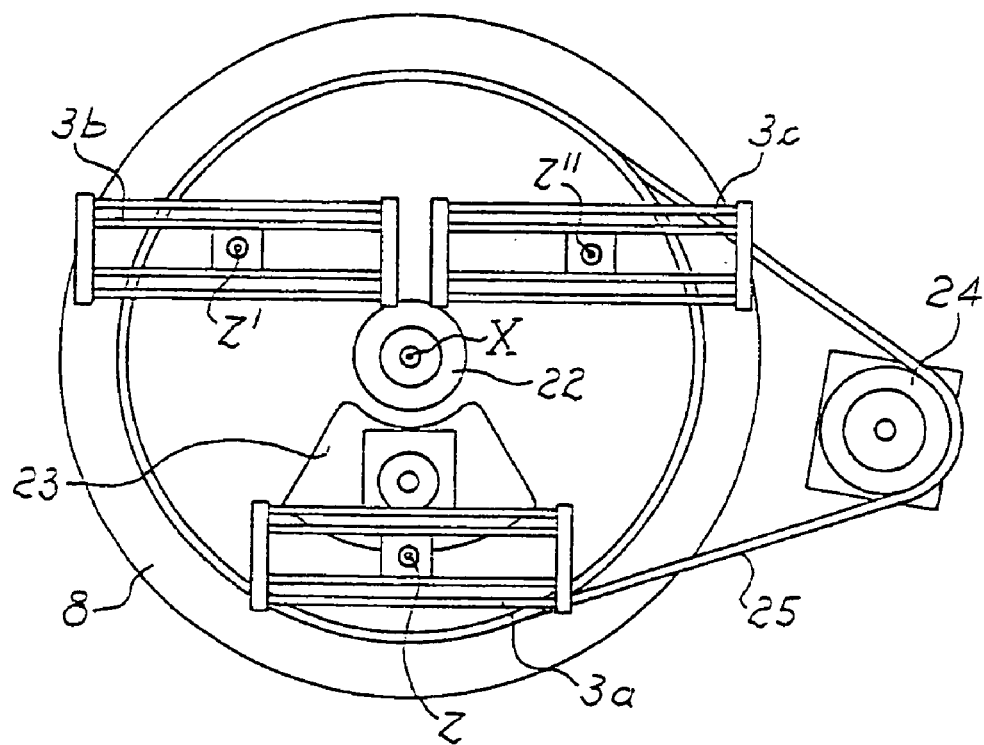

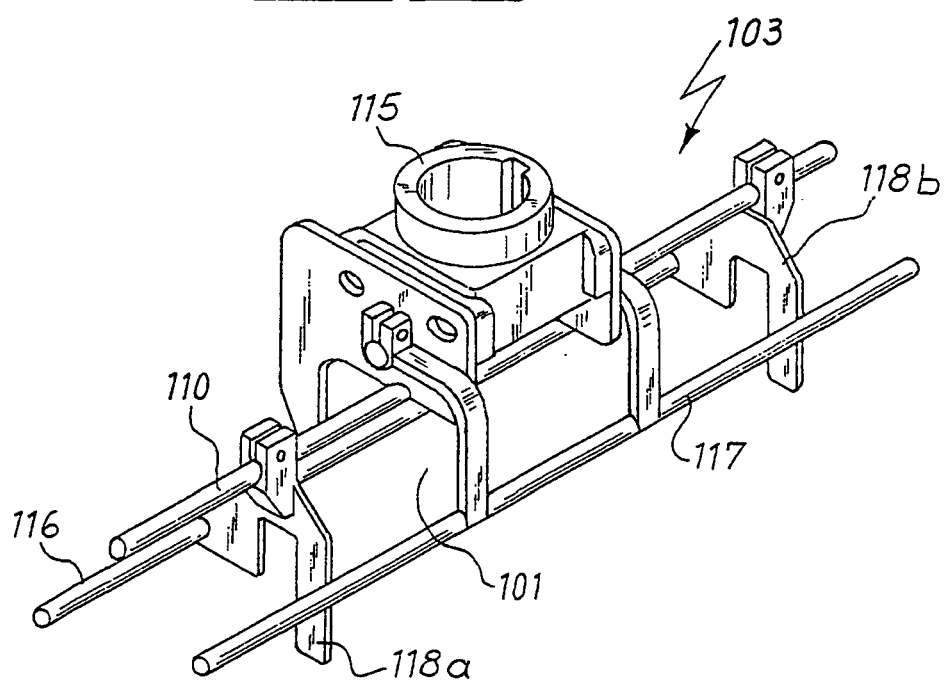

TRANSFER DEVICE FOR CYLINDRICAL STACKS OF PRODUCTS ARRANGED ON AN EDGE

TECHNICAL FIELD OF THE INVENTION

The present invention relates to a transfer device and a method for the transfer of stacks, which have an external cylindrical shape, of oven-baked products resting on one of their side surfaces (edges) from a conveyor in which the stacks are conveyed in a direction transverse to the generatrices of the cylindrical shape to a conveyor in which the stacks are conveyed in a direction parallel to the generatrices of said cylindrical shape.

In particular, the present invention relates to a device capable of transferring cylindrical stacks of oven-baked products from a conveyor in which said stacks are caused to advance in a direction orthogonal to their own longitudinal axis to a conveyor in which the stacks are caused to advance in a direction parallel to their own longitudinal axis, until they reach packaging equipment for wrapping thereof.

By "stack of oven-baked products of small thickness" is meant a stock formed by foodstuffs baked in an oven, such as biscuits or crackers, grouped together in an orderly set, in which the products are set with their faces against one another so that the stack presents externally, or may be inscribed within, a cylindrical shape. Said products coming from an oven usually have the shape of a disk with a substantially circular or regular polygonal base.

Moreover, by the term "cylinder" or "cylindrical shape" is meant in what follows any body or geometrical shape defined as locus of the generatrices, parallel to one another, coming out of the points of a closed directrix. In this sense, the directrix may have any geometrical shape and may thus be, for example, a circle, an ellipse or a polygon (and in this latter case the cylinder coincides with a prism).

BACKGROUND OF THE INVENTION

In the manufacturing industry for producing oven-baked products of small thickness, for example biscuits, it forms part of the known art to subject the products, at output from the baking step, to a series of operations in which the products coming from an oven are selected, grouped together in stacks and, for their transfer, set "edge on", i.e., withheld during the conveying process, thanks to appropriate guides and sliders, in such a way that they rest their side surface (edge) on the surfaces of the conveyors. The aforesaid mode of transfer has proven to be the most effective both on account of the high rates of production rendered possible, and on account of the low rate of rejects that it involves.

After the step of grouping the products together into cylindrical stacks, the stacks are caused to advance in a direction transverse to their own axis, which is thus substantially horizontal, and are subsequently induced to translate in a direction coincident with said axis, so as to enable packaging of each stack by means of a synthetic film.

In particular, the packaging step envisages that the stack will be wrapped laterally in the film and then the latter will be sealed at the side, and subsequently in a position corresponding to the bases, in order to obtain the packet.

In order to vary the relative direction of advance of each cylindrical stack, it forms part of the known art for the conveyor set upstream, designed to translate the stacks in a direction orthogonal to the generatrices of each cylindrical stack, to be set in a position corresponding to its output portion orthogonal to the conveyor set downstream, which is designed to translate the stacks in a direction parallel to their generatrices. In this way, the stacks at output from the conveyor set upstream may be transferred directly, for example by gravity or by means of a percussion or pusher device, onto the conveyor set downstream, given that no absolute change of direction of the longitudinal axis (i.e., the one parallel to the generatrices) of the stacks is required.

The European patent application EP-A-0 084 763, in the name of CAVANNA, describes a plant for the conveying of biscuits towards a packaging machine. The CAVANNA system is provided with a continuous belt conveyor for biscuits, which are moved in a direction orthogonal to their longitudinal axis, which, in its terminal portion, extends at right angles above a conveyor belt with sockets designed to convey the biscuits in a direction coincident with their longitudinal axis. The biscuits at output from the top continuous belt are induced to drop into the sockets of the bottom belt. The CAVANNA patent application suggests the use of said system for generic products of cylindrical shape.

The above embodiment, albeit somewhat simplified mechanically, presents a number of drawbacks. In the first place, the oven-baked products of small thickness, owing to their somewhat brittle nature, in the passage, in general by gravity, from the top belt to the bottom one may get broken or chipped, with the consequent production of packets of biscuits that are not suitable for the market. Moreover, for the biscuits to fall exactly into the seats (sockets) provided, it is necessary to synchronize carefully the speed of advance of the top belt with that of the bottom conveyor belt, this generally involving both a limitation of the maximum speed achievable, and the necessity of calibrating the system with a certain frequency.

Finally, in the case where the plant described in the application EP-A-0 084 763 were used for conveying stacks of oven-baked products resting on edge, which is, on the other hand, an eventuality that is not explicitly contemplated in the text of the CAVANNA patent application, it would be necessary- to carry out an extremely precise synchronization and an accurate and frequent control of said synchronization in order to prevent the products set on edge (biscuits) of each stack from bumping against the baffle plates that define the sockets during their transfer, or in order to prevent a number of said products from dropping outside the sockets instead of inside. Furthermore, the CAVANNA plant does not enable alternative geometrical dispositions of the top conveyor belt with respect to the bottom belt, other than the arrangement at right angles envisaged, above all if in said plant it is intended to use products conveyed on their edges.

For the transfer of stacks of biscuits set "edge on" from a top conveyor belt to a bottom conveyor belt, in which the latter is provided with shaped seats within which the stacks are to be housed, there is known the solution proposed in the U.S. Pat. No. 4,627,215 in the name of SIG. The SIG patent envisages the presence of an orbital transfer device operatively set between the two conveyors and provided with a plurality of gripping assemblies within which each stack is set in a position corresponding to the belt conveyor set upstream and is hence drawn, on a special sliding surface, towards the seats of the belt set downstream.

The SIG transfer device, however, does not envisage that the conveyor set downstream causes the stacks to advance in a direction parallel to their axis, and hence does not enable orientation of the stacks in a different way with respect to the direction of advance in the passage from the conveyor set upstream to the conveyor set downstream.

The absence of any indication in the SIG patent regarding the possibility of orientation in a different way of the stacks of biscuits when they are passing from one conveyor to the other points to the fact that that the person skilled in the sector, specifically in the case of variation of the direction of conveying of the cylindrical stacks with respect to their generatrices, would not have received therefrom any suggestion to use an orbital conveyor and would thus not have used the aforesaid disposition at right angles of the conveyors set upstream and set downstream as described in the CAVANNA patent application. Furthermore, the impossibility of orientation of the stacks during transfer, as well as the geometry itself of the SIG transfer device, enables either only intermittent or else perfectly synchronized operation of the equipment. In fact, the conveyor set downstream must advance, at a rate dictated by the width of the seats, so as to present the subsequent empty seat in a position corresponding to the position of disengagement of the stack from the gripping assembly of the transfer device, must stop, and can resume its advance only when transfer of the stack has taken place.

A purpose of the present invention is to provide a method for the transfer of cylindrical stacks of oven-baked products resting on their side surface or edge, i.e., in which the products making up each stack are resting on one of their edges, from a conveyor in which the stacks advance in a direction orthogonal to the generatrices of their cylindrical shape, to a conveyor in which the stacks advance in a direction parallel to or coincident with said generatrices, which will enable a high speed of production, without thereby causing damage to the products in the stacks.

Another purpose of the present invention is that of providing, in a plant in which the cylindrical stacks of oven-baked products are resting on their side surface, a transfer device for transferring stacks between a conveyor set upstream, which translates each stack in a direction orthogonal to the generatrices of the cylindrical shape, and a conveyor set downstream, in which the stacks are caused to advance in a direction parallel to said generatrices, which will be particularly effective and which will not present the disadvantages of the known art described above.

A further purpose of the present invention is that of providing an equipment for the treatment of oven-baked products arranged in cylindrical stacks, in which said stacks are resting on their side surface during their advance, which will be rapid, which will not require a high precision of synchronization between the conveyor set upstream and the conveyor set downstream, and which will be particularly precise in the conveying operation so as to minimize the breaking or chipping of the products conveyed.

SUMMARY OF THE INVENTION

These and other purposes are achieved by the transfer device according to the claims listed herein.

The method according to the present invention for transferring cylindrical stacks of products resting on one of their edges from a conveyor set upstream for advance of the stacks in a direction transverse to the generatrices of the cylindrical shape to a conveyor set downstream for advance of the stacks in a direction parallel to said generatrices, or vice versa, involves the following steps:

engaging each stack, substantially in a position corresponding to the position of output from the conveyor set upstream, by means of a gripping and conveying assembly;

turning the gripping assembly occupied with a stack, in a motion of revolution about a first axis, between the position of output of the conveyor set upstream and a position of introduction onto the conveyor set downstream; and releasing the stack in the position of introduction onto the conveyor set downstream.

According to a preferred aspect of the present invention, the method envisages that the gripping assembly withholds each stack along at least two surfaces of the stack itself, so as to maintain the stack coherent during the transfer process, and that said assembly may rotate in a motion of rotation about one of its axes and translate along this latter axis in a motion of moving away and approaching with respect to the stacks to enable the required picking-up of each stack from the conveyor set upstream and the positioning of said stack on the conveyor set downstream.

According to a further aspect of the present invention, the method envisages that the axis about which the gripping assembly accomplishes its own motion of revolution is substantially orthogonal to the directions of advance of the conveyor set upstream and the conveyor set downstream, and that the law of motion obeyed by the gripping assembly contemplates a non-uniform angular velocity.

The transfer device for transferring stacks, having a cylindrical external shape, of products resting on one of their edges, between a conveyor set upstream for advance of the stacks in a direction transverse to the generatrices of the aforesaid cylindrical shape, and a conveyor set downstream for advance of the stacks in a direction parallel to said generatrices, or vice versa, according to the present invention, is operatively set between the aforesaid conveyor set upstream and the aforesaid conveyor set downstream, and comprises at least one assembly for picking up and conveying a stack. The gripping assembly moreover turns, according to a motion of revolution about a first axis, between a position of engagement of a stack, in a point corresponding to an output end of the conveyor set upstream, and a position of release of the stack onto the conveyor set downstream. According to a particular aspect of the present invention, the transfer device is provided with a plurality of gripping assemblies mounted, at equal distances apart, substantially on the outer circumference of a driven disk, so as to be able to rotate and translate about an axis of its own, in addition to rotating integrally with the driven disk. Moreover, the law of motion of the driven disk envisages a non-uniform angular velocity.

In a preferred embodiment of the transfer device according to the present invention, each gripping assembly has a structure capable of withholding a stack along at least two sides, and the transfer device presents a sliding surface along which the stocks of oven-baked products, withheld by the gripping assembly, are drawn by the conveyor set upstream onto the conveyor set downstream.

The equipment, according to the present invention, for the conveying of stacks, having a cylindrical external shape, of products resting on one of their edges, comprises a conveyor set upstream, on which the stacks are caused to advance in a direction transverse to the generatrices of the aforesaid cylindrical shape, and a conveyor set downstream, on which the stacks are caused to advance in a direction parallel to said generatrices, or vice versa, and is likewise provided with a transfer device of the type claimed in Claims 1–15.

BRIEF DESCRIPTION OF THE DRAWINGS

In what follows there will be illustrated, purely by way of non-limiting example, various embodiments of the present invention, with the aid of the attached figures, in which:

FIG. 1b is a schematic plan view from above of a different embodiment of equipment for transferring cylindrical stacks of oven-baked products of small thickness resting on one of their edges, comprising a transfer device according to the present invention;

FIGS. 3a, 4a, 5a, 6a and 3b, 4b, 5b, 6b are schematic illustrations respectively from above and in profile of a transfer device according to a preferred aspect of the present invention, illustrated in various operating steps;

FIG. 7 is a schematic profile view of a gripping and conveying assembly according to a particular aspect of the present invention;

FIGS. 9a, 9b, 9c, 9d show an operating sequence of positioning of a gripping assembly, of the type illustrated in FIGS. 7 and 8, occupied with a stack, releasing of the stack onto the conveyor set downstream, and moving away of the gripping assembly;

FIG. 11 illustrates, in plan view from below, other details of a transfer device according to the present invention;

FIG. 13 shows a perspective view of a gripping assembly, according to a preferred aspect of the present invention.

DETAILED DESCRIPTION OF PREFERRED EMBODIMENTS OF THE INVENTION

Figure 1A:
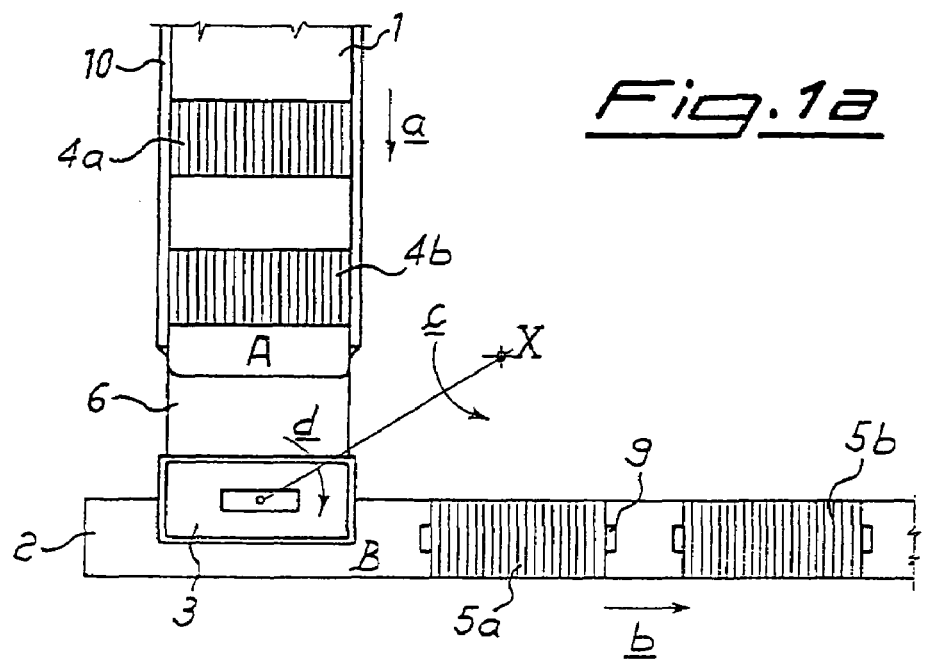
FIG. 1a is a schematic plan view from above of an embodiment of equipment for transferring cylindrical stacks of oven-baked products of small thickness resting on one of their edges, comprising a transfer device according to the present invention.
Figure 2:
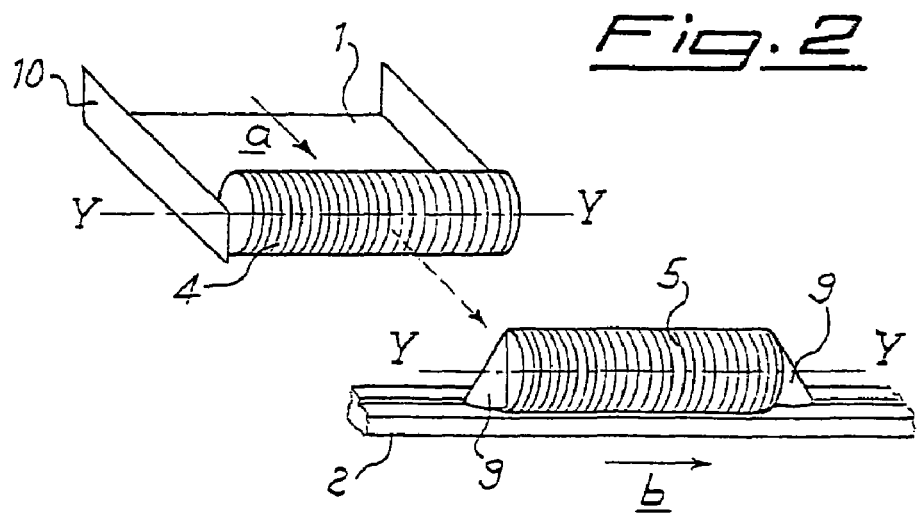
FIG. 2 is a schematic perspective view of the mode of conveying the stacks along the conveyor set upstream and the conveyor set downstream of the equipment according to the present invention.

With reference to FIGS. 1a and 1b, two embodiments of equipment are illustrated, according to the present invention, for the conveying of cylindrical stacks of foodstuff products of small thickness resting on one of their edges, comprising a conveyor set upstream 1, in which the stacks are caused to advance in a direction a orthogonal to the generatrices of the cylindrical stack, a conveyor set downstream 2, in which the stacks are conveyed in a direction b parallel to said generatrices, and an orbital transfer device for transferring the stacks from the conveyor set upstream 1 to the conveyor set downstream 2. FIG. 2 schematically illustrates, by way of example, the spatial disposition of the cylindrical stacks with respect to their directions of advance a and b in the two conveyors 1, 2.

It is to be noted that, in the attached figures, identical reference numbers indicate identical parts of the equipment and/or of the transfer device.

The orbital transfer device represented in FIGS. 1a, 1b, according to the present invention, comprises at least one gripping and conveying assembly 3, which turns, in a motion of revolution c, about an axis X, between a position A of engagement with a stack 4, 4a, 4b, 5, 5a, 5b, at output from the conveyor set upstream 1, and a position B of release of the stack 4, 4a, 4b, 5, 5a, 5b onto the conveyor set downstream 2.

In particular, in the embodiment of FIG. 1a, with reference to a plant for the production of packets of biscuits, the conveyor set upstream 1 is provided with side guides 10 within which by sliding the cylindrical stacks of biscuits 4a, 4b set "edge on" are caused to advance, thanks to known means (not illustrated), in a direction a substantially orthogonal to the generatrices of each stack 4a, 4b, and hence orthogonal to the axis Y—Y (see FIG. 2) of each stack.

The conveyor set downstream 2 is set at right angles to the conveyor set upstream 1 and is provided with means 9, in particular supporting fingers, for translation, in the direction b substantially parallel to the generatrices of the stacks 5a, 5b, and hence to their axis Y—Y (FIG. 2), of the aforesaid stacks 5a, 5b coming from the conveyor 1. The directions a and b are thus orthogonal to one another.

Operatively set between the conveyors 1 and 2 there is present an orbital transfer device comprising at least one gripping assembly 3, which is shaped like a cylindrical cage and is capable of engaging and withholding at least two sides of each stack. The gripping assembly 3 is mobile in a motion of revolution c about an axis X that is substantially orthogonal both to the direction a and to the direction b along which the stacks 4a, 4b, 5a, 5b are respectively caused to advance by the conveyors 1 and 2. In particular, the gripping assembly 3, as mentioned above, is mobile between a position A of engagement with the stack 4a, 4b, which arrives advancing from the conveyor set upstream 1, and a position B of release onto the conveyor set downstream 2. The said assembly 3, in the particular embodiment illustrated, may moreover be subject to a motion of rotation d and to a motion of translation either approaching to or moving away from the stacks, with respect to an axis of its own, as will be clarified in what follows.

The transfer device illustrated in FIG. 1a moreover comprises a sliding surface 6 set between the two conveyors 1 and 2, on which the stacks withheld and set in motion by the gripping assembly 3 are drawn by the conveyor set upstream 1 to the conveyor set downstream 2.

The equipment represented in FIG. 1b is similar to that of FIG. 1a, except for the fact that the conveyor set upstream 1 and the conveyor set downstream 2 are positioned adjacent to one another according to an acute angle, namely at an angle of approximately 45°, and consequently the directions of advance a and b', which the conveyors 1 and 2 respectively impose on the stacks 4a, 4b, 5a, 5b, are mutually incident.

With this geometrical arrangement of the conveyors 1, 2, for the stacks to be set with their own axis Y—Y (see FIG. 2) parallel to the direction b' on the conveyor set downstream 2, the rotation of the gripping assembly 3 about an axis of its own in the direction d indicated in FIG. 1a might no longer prove necessary. In this case, the gripping assembly 3 would be built so as to turn in a motion of revolution c about the axis X and possibly in such a way as to translate, either approaching the stacks or receding from them, along an axis of its own, but would not be able to rotate about the latter.

In the embodiment of FIG. 1b, moreover, the sliding surface 7 is appropriately shaped according to a curved shape to enable the stacks at output from the conveyor set upstream 1, in the position A, to be transferred effectively onto the conveyor set downstream 2, in the position B.

The use of at least one rotary gripping assembly 3 turning in a motion of revolution c about an axis X between a position A of engagement and withholding of the stack of products which arrives at output from the conveyor set upstream 1 and a position B of release onto the conveyor set downstream 2, the said conveyors 1 and 2 presenting different directions of advance of the stacks in relation to the generatrices or to the axis Y—Y of the stacks themselves, enables kinematics decoupling of the two conveyors 1 and 2. In fact, by varying the law of motion to which the gripping assembly is subject, and possibly using a plurality of gripping assemblies operating consecutively, it is possible to obtain a continuous, i.e., non-intermittent, conveying of the stacks on the two conveyors 1, 2, in this way increasing the running rate of the equipment and its productivity. The possibility of modifying the law of motion of the gripping assembly 3, which is preferably a non-uniform speed law of motion, whereby the assembly 3 is subject to accelerations and decelerations in its operating cycle, renders the equipment extremely simple to calibrate, i.e., to obtain an optimal synchronization of the pitch of advance of the stacks on the conveyor 1 with the speed of translation of the stacks themselves on the conveyor 2.

Furthermore, the use of a gripping assembly 3 that can turn about between the two conveyors 1, 2 enables minimization of the possible impact of the stacks on the conveyor set downstream 2, and hence renders less traumatic the transfer of the stacks from the conveyor set upstream 1 to the conveyor set downstream 2.

FIGS. 3a, 4a, 5a, 6a and 3b, 4b, 5b, 6b show, in equipment of the type illustrated in FIG. 1a in which the directions a , b of advance of the stacks on the conveyor set upstream 1 and the conveyor set downstream 2 are orthogonal, a transfer device, according to a preferred aspect of the present invention, during its operation, in a schematic view respectively from above and in profile.

The transfer device, operatively set between a conveyor set upstream 1 and a conveyor set downstream 2, designed respectively for the translation of the cylindrical stacks 4a, 5a, 5b in a direction orthogonal a and parallel b to the generatrices of the stocks themselves, comprises three gripping assemblies 3a, 3b, 3c constrained in three points set at equal distances apart on the outer circumference of a driven disk 8 which turns, in the direction indicated by the arrow c , about a fixed axis X. The transfer device further comprises a bottom sliding surface 6, on which the stacks withheld by the gripping assemblies 3a, 3b, 3c are drawn along by the conveyor set upstream 1 to the conveyor set downstream 2.

FIG. 11 illustrates, in plan view from below, an example of embodiment of the structure of FIGS. 3a–6a and 3b–6b, in which the three gripping assemblies 3a, 3b and 3c are constrained to the driven disk 8 in points set at equal distances apart on the outer circumference of the disk 8 itself. The disk 8 is induced to rotate about a pin 22, which extends along the aforesaid axis X of revolution, by a motor 24 via a drive belt 25 for transmission of motion. The motor 24, preferably a brushless electric motor, is appropriately regulated by an automatic control device (not shown) capable of imposing on the disk 8, and hence on the gripping assemblies 3a, 3b and 3c, any law of motion set by an operator.

In the embodiment illustrated, the gripping assemblies 3a, 3b, 3c are moreover constrained to the disk 8 not only in such a way as to be able to perform a motion of revolution about the axis X, but also so as to be able to rotate respectively each about an axis of its own Z, Z', Z" and to translate, moving away from or approaching to the disk 8, each along the said respective axis Z, Z', Z". The three axes Z, Z', Z", in the embodiment of FIGS. 3a–6a and 3b–6b, are parallel to the axis X, and hence are also mutually parallel, and extend in a direction perpendicular to the directions a , b of advance of the conveyors 1 and 2.

The gripping assemblies 3a, 3b and 3c are thus induced to rotate and translate along their respective axes Z, Z' and Z" by control means (not illustrated), which, according to the angular position assumed by the driven disk 8, and hence by each gripping assembly, regulate the rotation and/or translation in approach to/moving away from the disk 8 of each assembly 3a, 3b and 3c.

In detail, said control means for the translation along the axes Z, Z', Z" may comprise, for example, cams or shaped surfaces, fixed with respect to the disk 8, that are covered by a follower which is integral with each gripping assembly 3a, 3b, 3c. Said cams or shaped surfaces are thus designed to define a plurality of paths which each assembly 3a, 3b, 3c follows along an axis of its own Z, Z', Z" during each cycle of rotation of the disk 8.

The control means may likewise comprise, as in the embodiment of FIGS. 3a–6a and 3b–6b, a device (or means) for synchronizing the motion of revolution of each gripping assembly 3a, 3b, 3c about the axis X with the motion of rotation about the respective axes Z, Z' and Z", so as to draw along the stacks, maintaining the axis Y—Y, or the generatrices, of each cylindrical stack always parallel to itself during displacement from the conveyor 1 to the conveyor 2. The aforesaid synchronization device (not illustrated)—which may, for example, comprise toothed gear wheels connected to the disk 8 for meshing with gears integral with each assembly 3a, 3b, 3c—in other embodiments of the present invention, such as for example the one illustrated in FIG. 1b, may not be present or act so as to vary the absolute position of the axis Y—Y, and hence of the generatrices, of each stack during transfer.

The operation of the transfer device illustrated in FIGS. 3a, 4a, 5a, 6a and 3b, 4b, 5b, 6b, which represent a working sequence of the said transfer device, is described in what follows.

In the operating position illustrated in FIGS. 3a and 3b, the gripping assembly 3a has just released the stack 5b onto the conveyor set downstream 2, whilst the assembly 3c covers its return travel and the assembly 3b is about to engage with a stack 5a present at output from the conveyor set upstream 1. As may be seen in FIG. 3b, the gripping assembly 3a, even though it is still in a lowered position (i.e., distant from the disk 8), is not occupied with the stack 5b, and the latter is conveyed, in a direction parallel to its generatrices, by fingers 9 of the conveyor 2. The gripping assembly 3c is instead in its raised position, closer to the disk 8, whilst the gripping assembly 3b is induced to drop towards the stacks 5a, 4a, which are conveyed by the conveyor set upstream 1 in a direction that is transverse, in this case orthogonal, to their generatrices and are withheld within side guides 10.

In the subsequent operating position illustrated in FIGS. 4a and 4b, the gripping assembly 3a rotates moving away from the conveyor 2 and is pushed to rise, as it approaches the disk 8, by the control means. The gripping assembly 3b, instead, is by now completely lowered, and engages, withholding it, the stack 5a which the conveyor 1 has conveyed to the output. The gripping assembly 3c is still in its return travel and is in a position that is raised with respect to the conveyor 1.

In the subsequent position, illustrated in FIGS. 5a and 5b, the gripping assembly 3a is in the process of its return travel in a raised position, i.e., as it approaches the disk 8, whilst the assembly 3c, which has by now arrived in the proximity of the conveyor set upstream 1, starts to drop down. The gripping assembly 3b, meanwhile, draws the stack 5a onto the sliding surface 6 towards the conveyor set downstream 2.

The stack 5a will be released by the gripping assembly 3b onto the conveyor 2 within a seat defined by two connected fingers 9, one at the front and the other at the rear of the stack 5a itself. The structure and disposition of said connected fingers will be examined in detail, in the sequel, with reference to FIGS. 12a–12c.

Figure 6A:
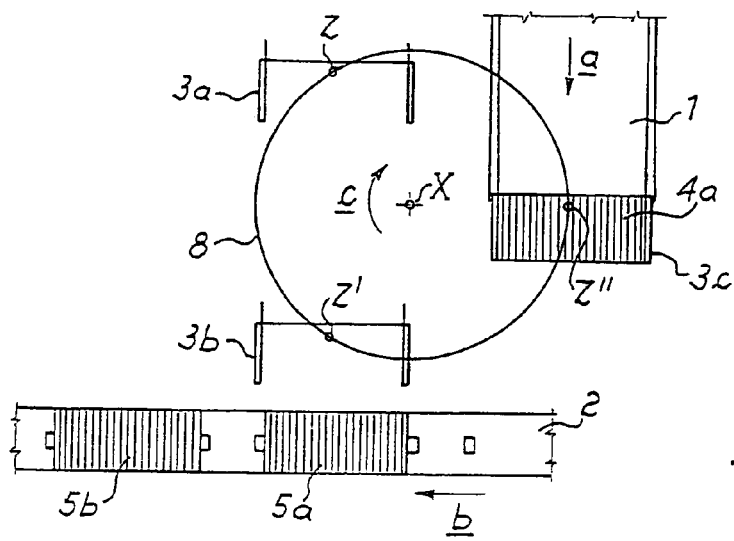
Figure 6B:
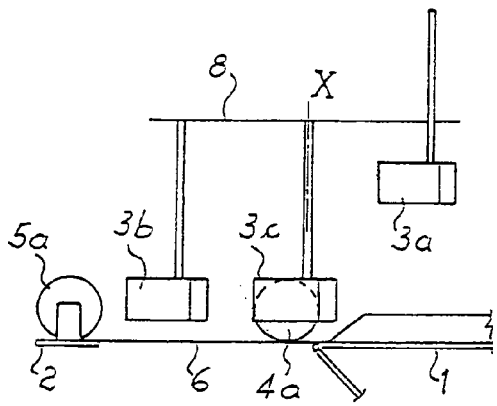

FIGS. 6a and 6b show the next step, in which the gripping assembly 3b has by now released the stack 5a onto the conveyor 2 and starts its return travel; the assembly 3a, in the raised position, is still distant from the conveyor 1, whilst the assembly 3c is lowered to engage with the next stack 4a at output from the conveyor 1. The stack 5a is by now firmly withheld and moved in a direction parallel to its generatrices by a pair of fingers 9.

Figure 10A:
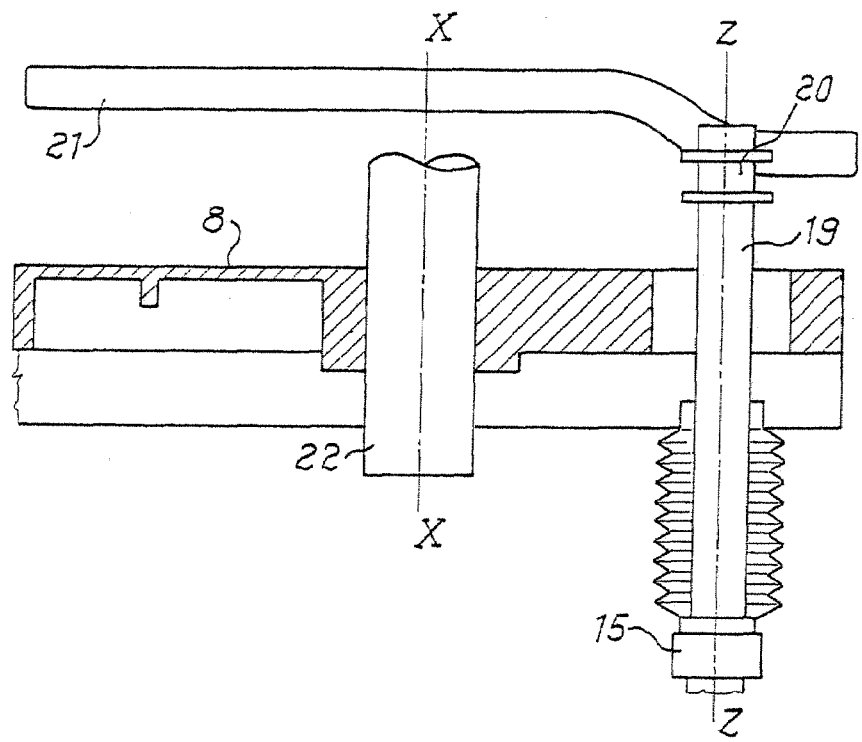
FIGS. 10a, 10b illustrate, in profile and partially in cross-sectional view, a number of details of a transfer device according to the present invention.

FIG. 10a is a cross-sectional view, according to a particular embodiment of the technical features described in FIGS. 3a–6a and 3b–6b, of the driven disk 8, which rotates about the axis X on a pin or shaft 22, to which there is constrained, in such a way that it is able to rotate and slide with respect to an axis of its own Z, a gripping assembly 3 (not illustrated). In particular, the gripping assembly 3 is connected by means of a hub 15 to a stem 19, which engages in a seat made on the outer circumference of the disk 8. The stem 19 terminates with an end 20 which functions as follower within a guide, or surface, shaped like a cam 21, which is fixed with respect to the disk 8 and is conformed to enable, according to the angular position assumed by the gripping assembly 3 and hence by the follower 20, rectilinear motion of raising and lowering of the gripping assembly itself with respect to the conveyors 1 and 2.

Figure 8:
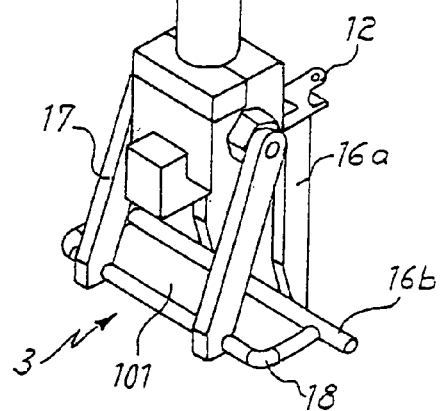
FIG. 8 is a perspective view of the gripping assembly illustrated in FIG. 7.

FIGS. 7 and 8 show in greater in detail a particular gripping assembly 3, which can be used in the embodiments described above and which is able to withhold and release stacks 5 of products. The gripping assembly 3 is illustrated in FIG. 7 during the step of transfer of a stack 5 onto the conveyor set downstream 2, prior to its disengagement from said stack 5. In FIG. 7 there may thus be noted, in a front view, a withholding finger 9 and two side guides 11a, 11b of the conveyor 2, whilst a stack 5 of biscuits resting on their own edges is transferred onto a plane of sliding of the conveyor 2 itself.

The illustrated gripping assembly 3 has a cage-like structure provided with an open bottom portion 101, within which a stack 5 of biscuits may be housed, and side portions, defined by curved side rods 16b and 18, designed to contain said stack 5 to prevent the latter from possibly losing coherence during the transfer process.

More in particular, the curved side rod 16b is integral with two uprights 16a fixed to a base portion 14, which, in turn, is constrained by means of a hub 15 and a stem 19 (not illustrated) to the driven disk 8. The curved side rod 18, which when engaged with the stack 5 extends along three sides adjacent to the latter, is instead integral with the arms 17, which are constrained to the base portion 14 by means of an articulation comprising an L-shaped lever 13c and an articulated parallelogram provided with the cranks 13a, 13b. The arms 17 are likewise connected to a slider 12 which, being provided with an appropriate follower element designed to engage with a shaped surface fixed with respect to the motion of rotation of the assembly 3, actuates the arms 17 relatively moving away or approaching with respect to the uprights 16a.

Consequently, during the motion of revolution of the assembly 3 about the axis X, the slider 12, in a point corresponding to pre-defined angular positions reached by the assembly 3 itself, actuates, in relative opening or closing, the containment rod 18 and the rod 16b for, respectively, releasing and withholding the stack of biscuits 5.

Figure 10B:
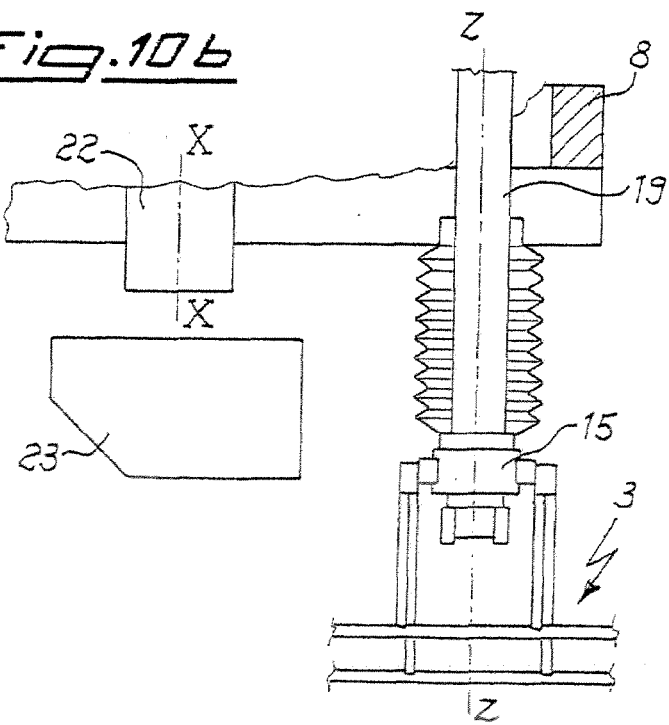

The use, in the gripping assembly 3, of a cage capable of withholding only two non-adjacent sides of each stack 5, coupled to a sliding surface 6, 7, possibly provided with side withholding guides is a further embodiment (not illustrated) of said particular aspect of the present invention The implementation of some of the technical solutions described above with reference to FIGS. 7 and 8 is shown schematically in FIG. 10b. FIG. 10b represents, in the same section as the one illustrated in FIG. 10a, a gripping assembly 3 in a motion of revolution about a pin 22 of the disk 8. FIG. 10b likewise illustrates a guide block 23 having a shaped surface on which the follower element of the slider 12 of the gripping assembly 3 may slide during its motion of revolution about the axis X. The guide block 23 is fixed with respect to the disk 8 and is conformed to enable driving of the slider 12 according to the angle of rotation reached by the gripping assembly 3 in order to move away and/or bring closer together the containment rods 16b and 18 of the assembly 3 during each operating cycle.

FIGS. 9a–9d illustrate subsequent steps of the operation of a gripping assembly 3, of the type described with reference to FIGS. 7 and 8, during the steps of releasing a stack 5 onto the conveyor set downstream 2. Said subsequent releasing steps correspond, obviously, to subsequent angular positions assumed by the assembly 3 in its motion of revolution integral with the disk 8 about the axis X. In the various angular positions reached by the assembly 3, as described above, the slider 12 will push or pull, respectively in opening or closing, the arms 17 and the rod 18 with respect to the uprights 16a and to the rod 16b.

FIG. 9a, in particular, shows the last step of drawing a stack 5 onto the conveyor 2. The stack 5 is still withheld by the cage defined by the rods 18 and 16b of the gripping assembly 3 and is translated onto the sliding surface of the conveyor 2, immediately set downstream of a supporting finger 9 designed to move the stack 5 in a direction parallel to the generatrices of the latter. The slider 12 withholds in closing the arms 17 with respect to the uprights 16a.

Figure 9B:
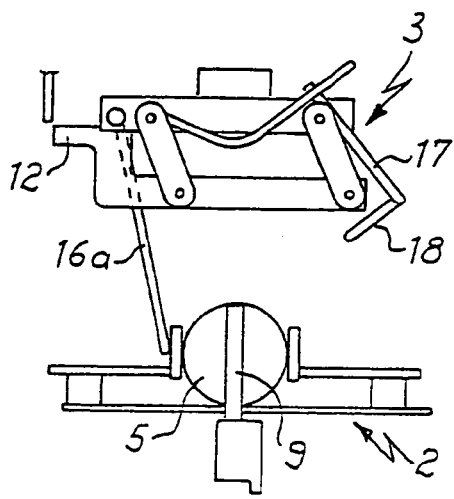

FIG. 9b illustrates the subsequent step of release of the stack 5, in which the slider 12 acts on the articulation 13a, 13b, 13c (see FIG. 7) to withhold the arms 17 in such a way that they are raised moving away from the uprights 16a and thus enable disengagement of the gripping assembly 3 from the stack 5. The assembly 3, as also in the step shown in the previous FIG. 9a, is in a lowered position, i.e., adjacent to the stack 5 and to the conveyor 2.

Figure 9C:
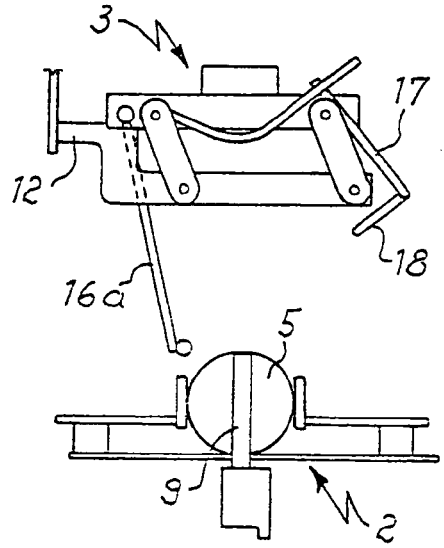

In the next step, illustrated in FIG. 9c, the assembly 3, by now disengaged from the stack 5, is induced to rise, i.e., to move away from the conveyor 2 towards the disk 8, albeit maintaining the arms 17 in an opened condition with respect to the uprights 16a. The stack 5 is by now withheld laterally by the guides 11a, 11b (see FIG. 7) and is supported and pushed to advance in a direction parallel to its generatrices (coincident with its longitudinal axis) by the fingers 9 of the conveyor 2.

Figure 9D:
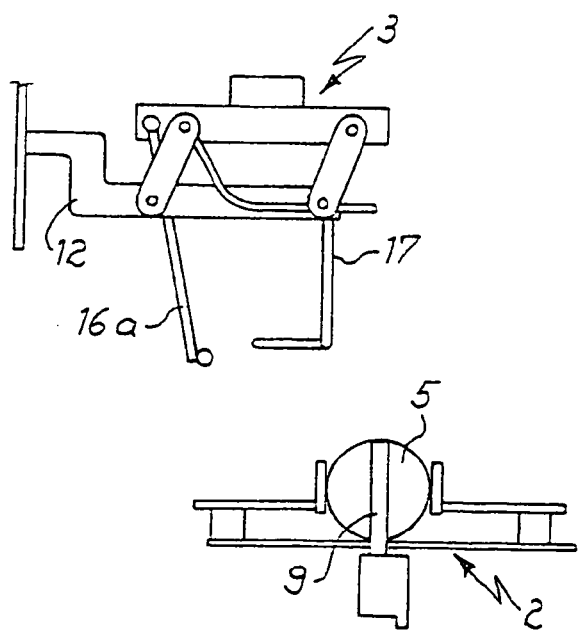

FIG. 9d shows a step of the operating cycle, in which the assembly 3 is in the course of its return travel in a raised position, i.e., moved away from the conveyor 2 towards the disk 8, and the stack 5 is made to advance by the conveyor 2. The slider 12 no longer withholds the arms 17 in an open condition with respect to the uprights 16a in order to reduce to the overall dimensions of the assembly 3 in its return travel. The slider 12 will be able to re-open the arms 17 in their motion of moving away from the uprights 16a during the step of engagement (for example, illustrated in FIGS. 6a, 6b) of the assembly 3 with a subsequent stack at output from the conveyor set upstream 1, and will then close said arms 17 in their motion of approaching to the uprights 16a in the subsequent step of transfer (for example, illustrated in FIGS. 4a and 4b) of the stack from the conveyor set upstream 1 to the conveyor set downstream 2. These steps will be followed by the steps illustrated in FIGS. 9a–9d.

Alternatively, the arms 17 and the uprights 16a will remain close to one another also during the step of engagement of the gripping assembly 3 with a stack at output from the conveyor set upstream 1, and said stack at output will be surrounded by the rods 16b and 18 during the lowering of the assembly 3.

A further simplified embodiment of the gripping assemblies employable in a transfer device according to the present invention is shown in FIG. 13.

In particular, the gripping assembly 103, analogous to the one indicated previously with the numeric reference 3 for example in FIG. 8, has a cage structure with an open bottom portion 101 inside which a cylindrical stack 6 of biscuits arranged on its edge may be housed and held. The cage structure of the assembly 103 comprises a rear rod 116 to draw the cylindrical stack, a front rod 117 for holding and a top rod 110 constrained rigidly to a structure equipped with a hub 115 for connection to the driven disc 8.

The rear rod 116 and the front rod 117 are reciprocally parallel and, unlike the embodiment indicated in FIG. 8, they are not mobile in relation to each other during operation of the transfer unit. Moreover, the rods 116, 117 are fixed to two side plates 118a, 118b which constrain these rods 116, 117 to the top rod 110 and which act simultaneously as side holding elements for the cylindrical stack.

The distance between the rods 116 and 117 which defines the dimension in an orthogonal direction to the axis of the cylindrical stack 5 of the open bottom portion 101 to receive the cylindrical stack, may be easily adjusted before starting the process.

The use of a gripping assembly 103 in which there are no mobile arms to hold the cylindrical stack being processed, although requiring careful calibration of the distance between the rods 116 and 117 before starting each operating cycle, has proved to be particularly efficient as it allows the reduction of the structural complexity of the gripping assembly and the kinematics movements required to impart the law of motion necessary for its function, thus increasing reliability. Moreover, this simplification of the gripping assembly allows noteworthy savings in the production of gripping assemblies and therefore of the actual transfer device.

Thus, the operating cycle of each gripping assembly 3 or 3a, 3b, 3c, which defines a method according to a preferred aspect of the present invention, comprises the following steps (with reference to FIGS. 1 to 9d):

engaging, in a position corresponding to the position A of output of the stacks from the transfer device set upstream 1, a cylindrical stack 4, 4a, 4b, which is made to advance in a direction $\underline{a}$ orthogonal to its generatrices (or to its axis Y—Y);

turning said gripping assembly 3, 3a, 3b, 3c, withholding the stack 4, 4a, 4b previously engaged, in a motion of revolution $\underline{c}$ about a first axis X, between the position of output A from the conveyor set upstream 1 and the position of introduction B onto the conveyor set downstream 2;

releasing the stack 4, 4a, 4c in the position of introduction B onto the conveyor set downstream 2, which conveys said cylindrical stack 4, 4a, 4c in a direction $\underline{b}$ parallel to its generatrices; and completing, with a return travel, its own motion of revolution $\underline{c}$ about the axis X without engaging any stack 4, 4a, 4b.

In the peculiar embodiments illustrated in FIGS. 3a to 9d, the step of engagement with a stack 4a, 4b, 5a at output from the conveyor set upstream 1 is preceded, for each gripping assembly 3a, 3b, 3c, by the steps of raising the gripping assembly with respect to the conveyor 1 itself, angular displacement about the axis X (motion of revolution) until it arrives in the proximity of the stack 5a at output from the conveyor 1, and subsequent lowering until it withholds the stack 5a at output within the cage defined by the uprights 16a, the arms 17 and the side rods 18 and 16b.

The step of rotation of the gripping assembly 3a, 3b or 3c during withholding of the stack 5a takes place along a sliding surface 6 and envisages a step in which the motion of revolution $\underline{c}$ about the axis X is synchronized with the motion of rotation of the gripping assembly about its own axis Z, Z' or Z'', in order to maintain the generatrices of the stack 5a always parallel to themselves during the motion of transfer from the conveyor 1 to the conveyor 2.

Finally, the step of release of the stack 5a, in a position corresponding to the position B, onto the conveyor set downstream 2 envisages the step of opening the cage that withholds the gripping assembly 3a, 3b or 3c, by means of relative moving away between the arms 17 and the uprights 16, and hence relative moving away between the curved rod 18 and the rod 16b, and the step of subsequent raising of the gripping assembly, along its own axis Z, Z' or Z'', moving away from the conveyor 2, and the step of simultaneous revolution $\underline{c}$ about the axis of revolution X for starting the next step of return travel.

The said step of return travel of each gripping assembly 3a, 3b, 3c, envisages, as described above, that the gripping assembly, in the passage from the position B on the conveyor set downstream 2 to the position A on the conveyor set upstream 1, will not withhold any stack in such a way that the latter is engaged.

With reference now to Figures from 12a to 12c, equipment according to a preferred aspect of the present invention is described, in which advantageously the conformation of the conveyor set downstream 2 enables a convenient regulation of the seats for advance of the stacks, and hence a fast adaptability to possible new conditions of production.

Figure 12A:
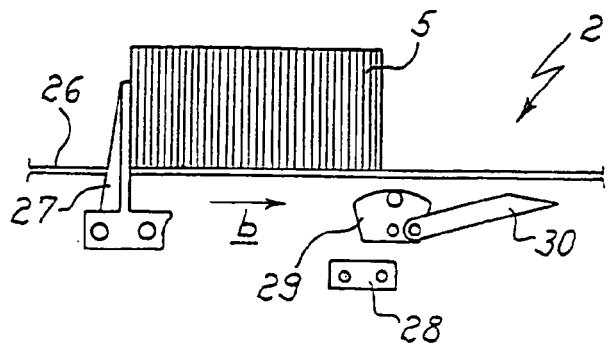
FIGS. 12a, 12b, 12c show, in a schematic profile view, means for withholding and displacing a stack which are present, according to a preferred aspect of the present invention, on the conveyor set downstream.
Figure 12B:
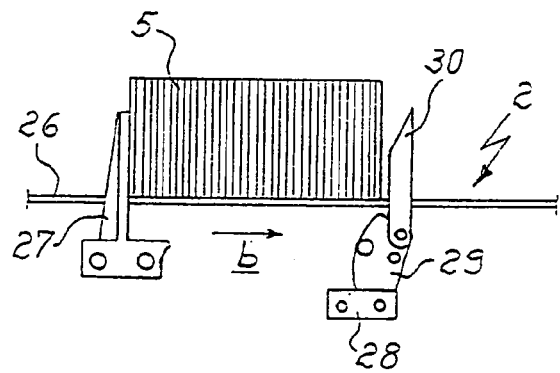
Figure 12C:
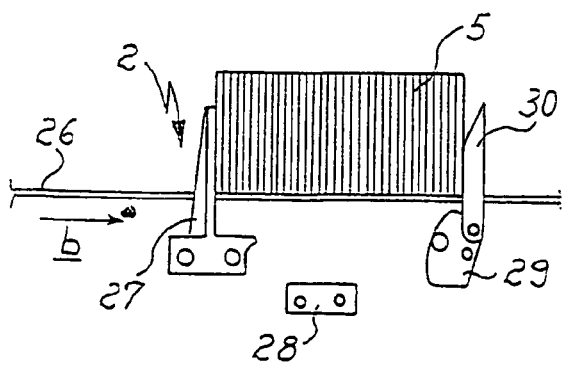

The conveyor set downstream 2, illustrated in FIGS. 12a–12c, comprises, as already mentioned above, a series of seats within which are housed the cylindrical stacks 5 with their generatrices substantially parallel to the direction $\underline{b}$ of advance of the conveyor. Each seat is defined by a pair of fingers, or baffle plates, both a rear one 27 and a front one 30—previously designated, without making any distinction, by the reference number 9—, which, appropriately operated, for example, by driven chains (not illustrated), provide for advance of each stack 5 on a plane of drawing 26. The front finger 30 of each seat, moreover, exerts an action of axial thrust on the base of the cylindrical stack 5 housed in the seat, to help maintain the stack 5 itself coherent during the conveying process.

In an advantageous embodiment of the conveyor 2, all the rear fingers 27 of the seats of the conveyor 2 are constrained to a first drive chain (not shown), and all the front fingers 30 are connected to a second drive chain (not shown either), adjustable separately from the first chain. The adjustment of one chain with respect to the other, i.e., the reciprocal spatial disposition of the two chains, which enables the relative variation of the distance between the rear fingers 27 and the front fingers 30, enables simple and rapid modification of the length of the seats within which the stacks-5 are housed for adapting the conveyor 2 to possible variations in the dimensions of the stacks 5.

In the embodiment illustrated, moreover, the front fingers 30 are elastically constrained, in order to come to bear upon each stack 5, to a cam element 29, which is in turn pivoted on a drive chain (not illustrated). Each cam element 29 is shaped for engaging with a contrast surface 28 that is fixed with respect to the motion of advance of the element 29, and hence of the corresponding finger 30. Said contrast surface 28 induces the element 29 and the finger 30 to rotate with respect to the plane 26.

The front finger 30 of each seat, which is set inclined underneath the plane of drawing 26 before arriving in a position corresponding to the contrast surface 28, is induced to rotate in engagement with a base of the cylindrical stack 5 by the rotation of the element 29 when the latter comes into contact with said contrast surface 28.

In greater detail, during operation of the conveyor 2, the front finger 30 is made to advance in a position inclined underneath the plane 26 until the stack 5, which is to occupy the seat defined by the front finger and by the rear finger 27, has been transferred onto the conveyor 2 by a gripping assembly 3 (FIG. 12a).

After release of the stack 5 onto the conveyor 2, the contrast surface 28, appropriately set for entering into contact with the profile of the element 29 immediately after said release of the stack 5, in a first rotation actuates the cam element 29, which induces the finger 30 to turn, protruding above the plane 26, so that it engages with the front base of the cylindrical stack 5 (FIG. 12b).

The further advance of the stack 5, pushed by the rear finger 27 and withheld by the front finger 30, causes, thanks to elastic thrust means, further rotation of the element 29, which is no longer engaged with the contrast surface 28, so that the front finger 30 comes to bear upon the base of the cylindrical stock 5 (FIG. 12c), exerting a slight pressure thereon.

Appropriate means (not illustrated), upon completion of advance of each stack 5 on the conveyor set downstream 2, will induce the element 29 and the finger 30 to rotate further to set themselves once again in the position illustrated in FIG. 12a, i.e., with the finger 30 inclined underneath the plane 26.

The rotation of the front finger 30 from a hide-away position to a position of engagement with each stack 5 is particularly useful during the step of release of the stack 5. In fact, said rotation prevents the finger 30 from being able to hinder transfer and release of each stack 5 by the gripping assembly 3 and enables a certain tolerance in the relative disposition of each stack with respect to the seats provided on the conveyor 2, this tolerance being then offset by the movement in engagement of the finger 30 on the front base of each cylindrical stack 5. The two subsequent rotations of the element 29, moreover, enable a not too violent impact of the finger 30 on the base of each stack 5.

The invention claimed is:

1. A transfer device for transferring stacks which have an external cylindrical shape, of products resting on one of their edges between a conveyor set upstream for advance of the stacks in a direction (a) transverse to the generatrices of said cylindrical shape and a conveyor set downstream for advance of the stacks in a direction (b) parallel to the generatrices of said cylindrical shape, or vice versa, the transfer device comprising at least one assembly for gripping and conveying each stack, the stack having the external cylindrical shape, wherein said at least one gripping assembly turns, according to a motion of revolution (c) about a first axis (X), between a position (A) of engagement with said stack, in a point corresponding to an output end of the conveyor set upstream, and a position of release (B) of the stack onto said conveyor set downstream, the transfer device further comprising motor means for the driving of said at least one gripping assembly according to a law of motion of non-uniform speed.

2. The transfer device according to claim 1, wherein said first axis (X) is substantially orthogonal to said directions transverse (a) and parallel (b) to the generatrices.

3. The transfer device according to claim 1, wherein said transverse direction (a) and said parallel direction (b) with respect to the generatrices are incident with respect to one another.

4. The transfer device according to claim 1, further comprising a connecting surface set between the conveyor set upstream and the conveyor set downstream, for the sliding of each stack of products during the displacement between said position of engagement (A) and said position of release (B).

5. The transfer device according to claim 1, wherein said at least one gripping assembly is able to slide along a second axis (Z) substantially incident to said transverse direction (a) and said parallel direction (b) with respect to the generatrices.

6. The transfer device according to claim 5, further comprising means for controlling the sliding of said at least one gripping assembly in the two senses along said second axis (Z) according to the angular position assumed by said gripping assembly in its motion of revolution (c).

7. The transfer device according to claim 6, wherein said means for controlling sliding comprise at least one shaped surface fixed with respect to said gripping assembly, said surface being designed to be traversed by a follower which is integral with said at least one gripping assembly.

8. The transfer device according to claim 1, wherein said at least one gripping assembly is likewise subject to a motion of rotation (d) about an axis of its own substantially parallel to said first axis (X).

9. The transfer device according to claim 8, in which said second axis and said axis of its own about which the motion of rotation takes place coincide.

10. The transfer device according to claim 1, wherein said at least one gripping assembly is mounted in a point of constraint along the outer circumference of a driven disk.

11. The transfer device according to claim 10, further comprising a plurality of gripping assemblies, which are mounted in such a way that they are set at equal distances apart along the outer circumference of said driven disk.

12. The transfer device according to claim 1, wherein said at least one gripping assembly comprises a cylindrical-cage structure for withholding each stack along at least two of its sides.

13. The transfer device according to claim 12, wherein said cylindrical cage comprises at least one portion with open base and at least one face or one lateral containment rod which is mobile with respect to the other faces, and in that said at least one gripping assembly comprises means for the displacement of said face or mobile lateral rod according to the angular position assumed by said at least one gripping assembly in ifs motion of revolution (c).

14. The transfer device according to either claim 12, further comprising means of synchronization of the motion of rotation (d) and of the motion of revolution (d) of said at least one gripping assembly.

15. Equipment for the conveying of stacks, having a cylindrical external shape, of products resting on one of their edges, comprising a conveyor set upstream, in which the stacks are caused to advance in a direction (a) transverse to the generatrices of said cylindrical shape, and a conveyor set downstream, in which the stacks are caused to advance in a direction (b) parallel to the generatrices of said cylindrical shape, or vice versa, characterized in that it comprises a transfer device according to claim 1.

16. The equipment according to claim 15, wherein said conveyor set downstream (2) comprises seats for housing each stack in a direction parallel to the generatrices of said cylindrical shape, each seat being delimited by a front, baffle plate or finger (30) and by a rear baffle plate or finger (27).

17. The equipment according to claim 16, wherein one (30) of said front or rear baffle plates or fingers (27, 30) that define a seat can be translated independently with respect to the other (27) of said rear or front baffle plates or fingers (27, 30) for varying the length of said seat.

18. The equipment according to claim 16, wherein the front fingers (30) or the rear fingers (27) are elastically connected in a rotary way to a conveying chain between a raised disposition for defining said seat and a lowered disposition.

19. The equipment according to claim 18, further comprising means (28, 29) for rotating the fingers elastically constrained to the conveying chain between the said two dispositions, namely the raised one and the lowered one, according to the position of the fingers with respect to said conveyor set downstream (2).

20. A method for the transfer of stacks, having a cylindrical external shape, of products resting on one of their edges from a conveyor set upstream for advance of the stacks in a direction (a) transverse to the generatrices of said cylindrical shape, to a conveyor set downstream for advance of the stacks in a direction (b) parallel to the generatrices of said cylindrical shape, or vice versa, characterized in that it comprises the following steps:

engaging each stack, substantially in the position (A) of output from said conveyor set upstream, by means of a gripping and conveying assembly;

turning said gripping assembly occupied with a stack, in a motion of revolution (c) about a first axis (X), between said position of output (A) from the conveyor set upstream and a position (B) of introduction onto said conveyor set downstream; and releasing the stack in said position (B) of introduction onto the conveyor set downstream;

wherein said step of turning the gripping assembly takes place according to a law of motion in which the angular velocity of the gripping assembly is not uniform.

21. The method according to claim 20, wherein said transverse direction (a) is incident to said parallel direction (b).

22. The method according to claim 20, wherein said first axis (X) is substantially orthogonal to said transverse direction (a) and to said parallel direction (b).

23. The method according to claim 20, wherein during said step of turning said gripping assembly, said gripping assembly is moreover induced to rotate in a motion of rotation (d) about an axis of its own (Z).

24. The method according to claim 23, wherein during said step of turning the gripping assembly, the motion of rotation and the motion of revolution of the gripping assembly are synchronized for transferring each of said cylindrical stacks without varying the spatial disposition of the generatrices of said cylindrical shape.

25. The method according to claim 20, wherein said step of engaging each stack comprises a step of translation of the gripping assembly, along an axis (Z) substantially parallel to said first axis (X) moving away from said stack of articles and a step of subsequent translation approaching towards said stack for engaging and withholding said stack.

26. The method according to claim 25, wherein said step of releasing the stack comprises the step of translation of the gripping assembly in a motion of moving away from said stack.

27. The method according to claim 20, further comprising a subsequent step of revolution, for the return of the gripping assembly, about said first axis from said position of introduction onto the conveyor set downstream to said position of output from the conveyor set upstream, the gripping assembly in said subsequent step of revolution of return not being occupied with any stack.

* * * * *